US012412548B2

(12) United States Patent
Staten et al.

(10) Patent No.: US 12,412,548 B2
(45) Date of Patent: Sep. 9, 2025

(54) STATIC DISPLAY METADATA MODIFICATIONS

(71) Applicant: Hewlett-Packard Development Company, L.P., Spring, TX (US)

(72) Inventors: Gregory Gore Staten, Spring, TX (US); Alexander Morgan Williams, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/561,467

(22) PCT Filed: May 28, 2021

(86) PCT No.: PCT/US2021/034893

§ 371 (c)(1),
(2) Date: Nov. 16, 2023

(87) PCT Pub. No.: WO2022/250696

PCT Pub. Date: Dec. 1, 2022

(65) Prior Publication Data

US 2024/0249698 A1 Jul. 25, 2024

(51) Int. Cl.
*G09G 5/00* (2006.01)

(52) U.S. Cl.
CPC ..... *G09G 5/006* (2013.01); *G09G 2340/0435* (2013.01)

(58) Field of Classification Search
CPC ....... G09G 5/006; G09G 3/2092–2096; G09G 2340/0435
See application file for complete search history.

(56) References Cited

U.S. PATENT DOCUMENTS

| | | | | |
|---|---|---|---|---|
| 8,310,502 | B2 | 11/2012 | Myers et al. | |
| 9,986,200 | B1 * | 5/2018 | Tsai | G09G 5/10 |
| 2006/0159109 | A1 | 7/2006 | Lamkin et al. | |
| 2015/0156469 | A1 | 6/2015 | Qu et al. | |
| 2017/0039690 | A1 | 2/2017 | Atkins et al. | |
| 2017/0186141 | A1 | 6/2017 | Ha et al. | |
| 2017/0193971 | A1 * | 7/2017 | Bi | G09G 5/18 |
| 2018/0090175 | A1 * | 3/2018 | Bradley | G11B 27/034 |
| 2019/0172388 | A1 * | 6/2019 | Saini | G09G 5/393 |
| 2019/0180454 | A1 * | 6/2019 | Choudhury | H04N 19/139 |
| 2021/0193065 | A1 * | 6/2021 | Smith | G09G 3/3614 |
| 2023/0395041 | A1 * | 12/2023 | Fitzgerald | H04N 21/440281 |

* cited by examiner

*Primary Examiner* — Xuemei Zheng
(74) *Attorney, Agent, or Firm* — Quarles & Brady LLP

(57) ABSTRACT

In some examples, a method includes detecting a trigger to modify static refresh rate metadata stored on a display device. In some examples, the method includes modifying, at the display device, the static refresh rate metadata to produce modified refresh rate metadata. In some examples, the method includes sending the modified refresh rate metadata to a source device.

15 Claims, 4 Drawing Sheets

STATIC DISPLAY METADATA MODIFICATIONS

BACKGROUND

The use of electronic devices has expanded. Some electronic devices include electronic circuitry for performing processing. As processing capabilities have expanded, electronic devices have been utilized to perform more functions. For example, a variety of electronic devices are used for work, communication, and entertainment. Electronic devices may be linked to other devices and may communicate with other devices.

DETAILED DESCRIPTION

Figure 1:
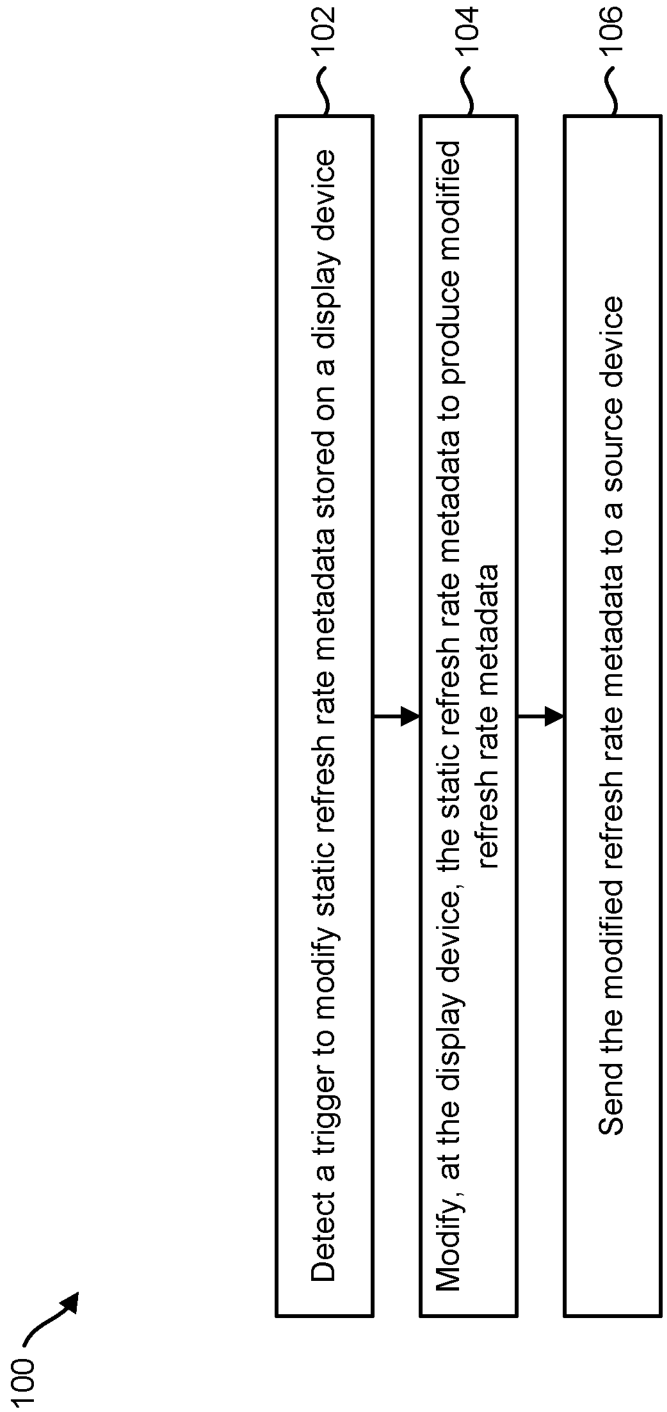
FIG. 1 is a flow diagram illustrating an example of a method for static display metadata modification.

One challenge in developing computer games with high dynamic range (HDR) is that consumer gaming displays have a limited luminance range available. This can result in game content being inadvertently clipped out on some displays. This may result in unobservable content (e.g., text, objects, etc.), which may lead to a competitive detriment for some players and/or may make a game difficult to use. To check for clipped content, game developers may play test with a wide variety of displays with different performance characteristics to ensure that no significant content is clipped out or otherwise not displayed. This approach may be time consuming and may demand that multiple displays be purchased and managed.

Some sink devices (e.g., monitors, televisions (TVs), etc.) may display a video signal from a source device. To enable display of a video signal, a sink device and/or a source device may set up a video link. During setup, for example, a sink device may send metadata to a source device. As used herein, metadata is information indicating a characteristic or characteristics of a sink device. Examples of metadata include display model, serial number, color primaries, white point, maximum luminance, minimum luminance, and/or supported timing(s) (e.g., refresh rate), etc. The source device may utilize the metadata to format the video signal for display. For instance, a host computing device (e.g., a personal computer (PC) with Windows) uses the minimum luminance and maximum luminance reported in metadata to inform a game engine about the display's luminance capabilities. Some or all of the metadata may be referred to as static metadata. Static metadata is information indicating a physical operational characteristic (or characteristics) and/or performance capability (or capabilities).

Examples of static metadata may include static refresh rate metadata and/or static luminance metadata. For instance, static maximum refresh rate metadata may represent a maximum refresh rate that a display device is designed to achieve and/or is capable to provide. Static minimum refresh rate metadata may represent a minimum refresh rate that a display device is designed to achieve and/or is capable to provide. A refresh rate is a rate at which pixel information is refreshed on a display panel. For instance, a refresh rate may be expressed in terms of frames per second (fps) or hertz (Hz). Static maximum luminance metadata may represent a maximum luminance that a display device is designed to achieve and/or is capable to provide. Static minimum luminance metadata may represent a minimum luminance that a display device is designed to achieve and/or is capable to provide. Luminance is a measure of light intensity per unit area. For instance, luminance may be expressed in terms of nits (where one nit is a candela per square meter, for example).

While static metadata is unchanging in some approaches, it may be helpful to dynamically modify static metadata. In some examples of the techniques described herein, HDR static maximum luminance metadata and/or static minimum luminance metadata may be modified. For instance, it may be helpful to have a display device that can set limits on its luminance output and communicate the change to a source device.

In some examples of the techniques described herein, static maximum refresh rate and/or static minimum refresh rate (e.g., a table of supported timings and/or default timing) may be modified. For instance, a default timing may be changed to support a smaller raster (e.g., half-width for picture-by-picture) and/or may allow modification of a variable refresh rate range to reduce and/or avoid display flicker due to a game choosing a wrong set of timings within the display's supported timings. In some examples, modifying timings may enable setting whether static "film-rate" timings are driven as single flash, double flash, triple flash, or another integer multiple of the content frame rate.

An electronic device is a device that includes electronic circuitry (e.g., integrated circuitry, a chip(s), etc.). Examples of electronic devices may include docks, monitors, televisions, display devices, display panels, graphics cards, graphics processing units (GPUs), motherboards, computing devices, smartphones, tablet devices, game consoles, video doorbells, cameras, security systems, smart speakers, voice assistants, etc. Some examples of electronic devices may utilize circuitry (e.g., controller(s) and/or processor(s), etc.) to perform an operation or operations. In some examples, electronic devices may execute instructions stored in memory to perform the operation(s). Instructions may be code and/or programming that specifies functionality or operation of the circuitry. In some examples, instructions may be stored in memory (e.g., Read-Only Memory (ROM), Erasable Programmable Read-Only Memory (EPROM), Electrically Erasable Programmable Read-Only Memory (EEPROM), flash memory, dynamic random access memory (DRAM), synchronous DRAM (SDRAM), magnetoresistive random-access memory (MRAM), phase-change random-access memory (PCRAM), hard disk drive (HDD), solid state drive (SSD), optical drive, etc.). In some examples, different circuitries in an electronic device may store and/or utilize separate instructions for operation.

In some examples, an electronic device may be linked to another electronic device or devices using a wired link. For example, an electronic device (e.g., display device, monitor, television, etc.) may include a wired communication interface (e.g., connector or connectors) for connecting electronic devices. Connectors are structures that enable forming a physical and/or electrical connection. For instance, a connector may be a port, plug, and/or electrical interface, etc. A connector or connectors may allow electronic devices to be connected with a cable or cables. Examples of connectors include DisplayPort™ (DP) connectors, High-Definition Multimedia Interface (HDMI®) connectors, Universal Serial Bus (USB) connectors, Lightning® connectors, Digital Visual Interface (DVI) connectors, OCuLink connectors, Ethernet connectors, etc.

In some examples, an electronic device may be linked to another electronic device with a wireless link. For instance, an electronic device (e.g., display device, monitor, television, etc.) may include a wireless communication interface to send and/or receive wireless (e.g., radio frequency (RF)) signals. Examples of wireless communication interfaces may include an Institute of Electrical and Electronics Engineers (IEEE) 802.11 (Wi-Fi) interfaces, Bluetooth interfaces, cellular (e.g., 3G, Long-Term Evolution (LTE), 4G, 5G, etc.) interfaces, etc.

A link between electronic devices may be a direct link (e.g., without an intervening device) or an indirect link (e.g., with an intervening device or devices). For instance, a link may be established between electronic devices over a network using a hub(s), repeater(s), splitter(s), router(s), and/or switch(es), etc.

In some examples, an electronic device may be linked to another electronic device to communicate a video signal. For instance, when the electronic devices are linked (e.g., a cable is plugged into both electronic devices and/or wireless communication is set up between electronic devices), the electronic devices may follow a protocol or protocols to set up a video link. A video link is a communication channel for video. For instance, a video link may carry a video stream (e.g., data corresponding to a series of video frames with or without audio) from one electronic device to another. A video link may include a physical and/or logical aspect or aspects. For instance, a video link may be set up when a cable is physically connected and/or a protocol condition or conditions are satisfied to enable video stream communication. In some examples, setting up a video link may be referred to as enumerating a display. As used herein, a "source device" is an electronic device for sending video and a "sink device" is an electronic device for receiving video. In some examples, an electronic device may be a source device or a sink device. In some examples, an electronic device (e.g., hub, daisy-chained monitor, etc.) may be source device and a sink device.

In some examples, setting up a video link (e.g., enumerating a display) may follow a protocol. For instance, a protocol may include a sequence of messages and/or functions to set up the video link. In some examples, DP video link setup may include hot plug detection (HPD), display identification (DisplayID) and/or extended display identification data (EDID) read, DisplayPort configuration data (DPCD) read, link training, and/or video stream output. In some examples, HDMI video link setup may include HPD, DisplayID and/or EDID read, and/or video stream output. Video link setup may vary based on the protocol(s) utilized and/or type of connection. For instance, video link setup for some protocols may utilize a connection detection signal (e.g., HPD signal) and display data (e.g., DisplayID and/or EDID) without other setup data (e.g., DPCD) and/or without link training. In some examples, video link setup for another protocol may utilize a connection detection signal (e.g., HPD signal), display data (e.g., DisplayID and/or EDID), setup data (e.g., DPCD) and/or link training. Some of the data described herein (e.g., display data, setup data, validity data, etc.) may be requested, sent, and/or received. For instance, an electronic device may request, send, and/or receive some of the signaling and/or data (e.g., HPD signal, DisplayID, EDID, and/or DPCD, etc.) described herein during detection, setup, and/or enumeration procedures.

HPD is a procedure where a signal (e.g., voltage, current, signal pattern, etc.) is sent or provided from one electronic device to another electronic device to indicate that a physical connection is made. For instance, a display may send or provide a signal to a GPU indicating that a physical connection is made between the display and the GPU.

In some examples, display data read may be a procedure where DisplayID and/or EDID is sent from one electronic device to another electronic device. Display data is data indicating a characteristic or characteristics of a display. For instance, DisplayID and/or EDID may include data indicating a manufacturer identifier (e.g., name), serial number, display size, supported timing(s), resolution(s) device type, and/or another characteristic or characteristics, etc. In some examples, a sink device may send the DisplayID and/or EDID to a source device to indicate a capability or capabilities of (e.g., video stream format(s) that can be displayed by) the sink device. In some examples, DisplayID and/or EDID may include examples of the metadata described herein.

In some examples, DPCD read may be a procedure where DPCD is sent from one electronic device to another electronic device. DPCD is data for a DP link. For instance, DPCD may include data indicating supported lane(s), supported bitrate(s), whether multi-touch is supported, repeater capability, and/or another characteristic or characteristics, etc. In some examples, a sink device may send the DPCD to a source device to indicate a capability or capabilities of the sink device for a DP link.

In some examples, link training may be a procedure where information is exchanged between electronic devices to assess and/or adjust a link parameter or parameters. For instance, link training may include signaling video from a source device to a sink device, assessing link quality, sending link quality indicator(s) from the sink device to the source device, and/or sending a voltage adjustment request from the sink device to the source device and/or other assessment(s) and/or adjustment(s), etc. In some examples, a source device may adjust a link parameter or parameters (e.g., output signal voltage) in link training.

In some examples, video stream output may be a procedure where a video signal is output from a source device to a sink device. For instance, a source device may send a series of video frames and/or audio to a sink device.

Throughout the drawings, similar reference numbers may designate similar or identical elements. When an element is referred to without a reference number, this may refer to the element generally, with and/or without limitation to any particular drawing or figure. In some examples, the drawings are not to scale and/or the size of some parts may be exaggerated to more clearly illustrate the example shown. Moreover, the drawings provide examples in accordance with the description. However, the description is not limited to the examples provided in the drawings.

FIG. 1 is a flow diagram illustrating an example of a method 100 for static display metadata modification. The method 100 and/or a method 100 element(s) may be performed by an electronic device (e.g., sink device and/or display device, etc.). In some examples, the method 100 may be performed by a sink device (e.g., display device). For instance, the method 100 may be performed by the display device 302 described in relation to FIG. 3. In some examples, the method 100 may be performed after a video link has been enumerated (with static metadata, for instance).

An electronic device (e.g., display device) may detect 102 a trigger to modify static refresh rate metadata stored on a display device. For example, a trigger is an event and/or input that may be utilized to initiate a procedure to modify static metadata. Examples of triggers may include a detected input from an input device (e.g., button press, touchscreen interaction, speech command received from a microphone, keyboard input, etc.), a received indicator, and/or a detected condition.

In some examples, detecting the trigger may include detecting an input via an on-screen display (OSD). An OSD is an interface presented on a display device for accessing and/or controlling an operation or operations of the display device. For instance, the display device may provide an OSD that is navigable and/or controllable with an input device(s) (e.g., button(s), joystick, touchscreen, and/or touchpad, etc.) on the display device and/or coupled to the display device. In some examples, a user may press a button or series of buttons indicating an instruction to modify static refresh rate metadata.

In some examples, detecting the trigger may include receiving an indicator from a source device. For instance, the display device may receive a signal, message, instruction, and/or code, etc., from a source device indicating the trigger. In some examples, a source device (e.g., computer, smartphone, tablet device, game console, etc.) may send the indicator over a wired and/or wireless link (e.g., video link). For example, a control channel or auxiliary channel of a video link may be utilized to send the indicator. In some examples, the indicator may be initiated on the source device based on a user input (e.g., a user may input a command) and/or an application event (e.g., a testing application may automatically generate and send the indicator). In some examples, the indicator may be a virtual control panel (VCP) code. For instance, a VCP code indicating an instruction to modify the static refresh rate metadata may be utilized (e.g., sent from the source device to the display device).

In some examples, detecting the trigger may include detecting a flicker condition. A flicker condition is a condition where the display device may exhibit flicker (e.g., temporary and/or repeated darkness) while displaying a video signal. Examples of flicker conditions may include a variable refresh rate change condition and/or a panel aging condition. For instance, detecting the flicker condition may include detecting a variable refresh rate change condition and/or a panel age condition. Variable refresh rate is a procedure where a display device may dynamically change refresh rate. For instance, a display device may change refresh rate to synchronize with a frame rate provided by a source device.

A variable refresh rate change condition is a case where a change in refresh rate is large enough and/or occurs within a short enough time that flicker may occur. For instance, some displays may exhibit flicker when a refresh rate change is large enough to potentially cause flicker and/or when a refresh rate change happens quickly enough to potentially cause flicker. In some examples, the display device may detect a variable refresh rate change condition by determining whether a refresh rate change (e.g., difference between a current refresh rate and a previous refresh rate) satisfies a refresh rate change threshold (e.g., 40 Hz, 55 Hz, 60 Hz, etc.). For instance, if $125-80\geq 40$ Hz, the refresh rate change threshold may be satisfied. In some examples, the display device may detect a variable refresh rate change condition by determining whether a refresh rate change speed (e.g., difference between a current refresh rate and a previous refresh rate divided by a transition period) satisfies a refresh rate change speed threshold (e.g., 40/1 second squared ($s^2$), 55/1 $s^2$, 60/1 $s^2$, etc. For instance, if $125-80\geq 40/1\ s^2$, the refresh rate change speed threshold may be satisfied.

A panel age condition is a case where display panel age may cause flicker for some refresh rates and/or variable refresh rate changes. As some display panels age, for instance, liquid crystal material may exhibit degraded performance and/or responsiveness, which may result in flicker for some refresh rates and/or variable refresh rate changes. In some examples, the display device may detect a panel age condition by comparing a panel age (e.g., difference between current date and manufacturing date) to an age threshold. The flicker condition may be detected if the age threshold is satisfied.

The electronic device (e.g., display device) may modify 104, at the display device, the static refresh rate metadata to produce modified refresh rate metadata. In some examples, modifying 104 the static refresh rate metadata may include substituting different refresh rate metadata for the static refresh rate metadata. In some examples, modifying 104 the static refresh rate metadata may include generating metadata (e.g., EDID and/or DisplayID) that indicates refresh rate metadata that is different from the static refresh rate metadata. For instance, the modified refresh rate metadata may indicate a maximum refresh rate that is different from a static maximum refresh rate and/or an actual maximum refresh rate of the display device. In some examples, the modified refresh rate metadata may indicate a minimum refresh rate that is different from a static minimum refresh rate and/or an actual minimum refresh rate of the display device. In some examples, refresh rate metadata may be expressed as a display timing or timings (e.g., maximum timing and/or minimum timing in EDID and/or DisplayID).

In some examples, modifying 104 the static refresh rate metadata may include changing (e.g., overwriting) the static refresh rate metadata in memory of the display device to the modified refresh rate metadata. In some examples, modifying 104 the static refresh rate metadata may include generating the modified refresh rate metadata without changing (e.g., overwriting) the static refresh rate metadata in memory of the display device.

In some examples, modifying 104 the static refresh rate metadata may include selecting a modified refresh rate from a table including a set of display timings representing modified refresh rates per resolution. For example, the display device may store a table including different modified refresh rates for selection. Table (1) illustrates an example of a table including values indicating a refresh rate. The headers in Table (1) indicate parameters that may be utilized for video signal timing information. While the structure of Table (1) is given as an example, some examples may utilize a different structure with more, fewer, and/or different parameters. In Table (1), hertz is denoted Hz, kilohertz is denoted kHz, and megahertz is denoted MHz.

TABLE 1

| H-Active | V-Active | V Frequency (Hz) | H Frequency (kHz) | Pixel Clock (MHz) | . . . |
|---|---|---|---|---|---|
| 2650 | 1440 | 240 | 388 | 1055.83 | . . . |
| . | . | . | . | . | ⋱ |
| . | . | . | . | . | |
| . | . | . | . | . | |

In Table (1), H-Active denotes a horizontal pixel dimension, V-Active denotes a vertical pixel dimension, V Frequency denotes a vertical refresh frequency, H Frequency denotes a horizontal refresh frequency, and Pixel Clock denotes a pixel clock frequency. In some examples, a table may include another value or values relating to timing and/or refresh rate. For instance, the table may include H Total, H Blank, H Front, H Sync, H Back, V Total, V Blank, V Front, V Sync, V Back, H polarity, V polarity, and/or another value or values in some examples. The examples of values provided in Table (1) and/or other values may be utilized in accordance with some of the techniques described herein.

In some examples, refresh rate data may include a resolution and/or refresh rate target. In some examples, refresh rate data may specify video frame timing in milliseconds. In some examples, the table including a set of display timings representing modified refresh rates may include one, some, or all of the aforementioned values. For instance, a table may include rows of differing values, where a selected row may indicate a modified refresh rate. In some examples, the values in the table may be stored and converted to hexadecimal values for representation purposes.

When a modified refresh rate is selected in some examples, any of the video signal values described above may be modified to adjust refresh rate. In some examples, the refresh rate timing includes a vertical component and a horizontal component for addressing purposes. In some examples, refresh rate may be described in terms of vertical refresh, though additional values corresponding to a refresh rate may be included in a structure (e.g., table). For instance, multiple values corresponding to panel and/or display timing information may be utilized in some examples. The values corresponding to the selected modified refresh rate may be sent. For instance, values corresponding to the selected modified refresh rate or refresh rate data may be sent as modified refresh rate metadata.

In some examples, the electronic device may select a modified refresh rate (e.g., modified refresh rate metadata, display timing, etc.) based on a received input. For instance, an input may be received via the OSD indicating a modified refresh rate (e.g., display timing) for selection. In some examples, the electronic device may select a modified refresh rate (e.g., display timing) to reduce and/or avoid a flicker condition. For instance, if a flicker condition is detected, the electronic device may select a modified refresh rate (e.g., a lower maximum refresh rate) that may reduce and/or avoid the flicker condition. In some examples, if a flicker condition is detected, the electronic device may select a next lower refresh rate multiple. For instance, if a current refresh rate is 100 Hz and a flicker condition is detected, the electronic device may select a modified refresh rate of 90 Hz (that is a next lower multiple of a 30 Hz frame rate of a video game, for example). In some examples, the electronic device (e.g., display device) may present a message (via the OSD, for instance) indicating that refresh rate has been modified to reduce flicker and/or requesting an input to confirm a new refresh rate to reduce flicker.

The electronic device (e.g., display device) may send 106 the modified refresh rate metadata to a source device. For instance, the electronic device (e.g., display device) may send 106 the modified refresh rate metadata to a source device via a video link (e.g., control channel, auxiliary channel, etc.). In some examples, the modified refresh rate metadata may be sent in association with an enumeration indicator. For instance, the modified refresh rate metadata may be sent in an EDID and/or DisplayID with a request to enumerate the video link.

In some examples, the source device may enumerate the video link in response to the enumeration indicator. For instance, the source device and the electronic device (e.g., display device) may enumerate (e.g., re-enumerate) the video link, where the modified refresh rate metadata is utilized to set up the video link. In some examples, the electronic device (e.g., display device) may receive video from the source device based on the modified refresh rate metadata. For instance, the source device may send a video signal that is within a modified refresh rate range specified by the modified refresh rate metadata.

The video signal may be produced by the source device. For example, the video signal may be produced by a graphics card (e.g., graphics processing unit) included in the source device. The electronic device (e.g., display device, monitor, television, etc.) may receive the video signal over a wired or wireless link from the source device (e.g., a computer, video game console, Digital Versatile Disc (DVD) player, Blu-ray player, camera, doorbell camera, smartphone, tablet device, etc.).

In some examples, an aspect or aspects of the method 100 may be performed for luminance metadata. For instance, an electronic device may detect a trigger to modify static luminance metadata stored on the display device. In some examples, an electronic device may modify, at the display device, the static luminance metadata to produce modified luminance metadata. In some examples, an electronic device may send the modified luminance metadata to a source device.

Some of the techniques described herein may provide a practical application or practical applications. For instance, some of the techniques described herein may provide modification of static metadata, which may help to reduce flicker and/or content clipping on a display device. Some of the techniques described herein increase functionality for a display device with a processor. For instance, some of the techniques described herein enable a display device to modify static metadata, which enables increased performance (e.g., reduced flicker and/or content clipping).

Figure 2:
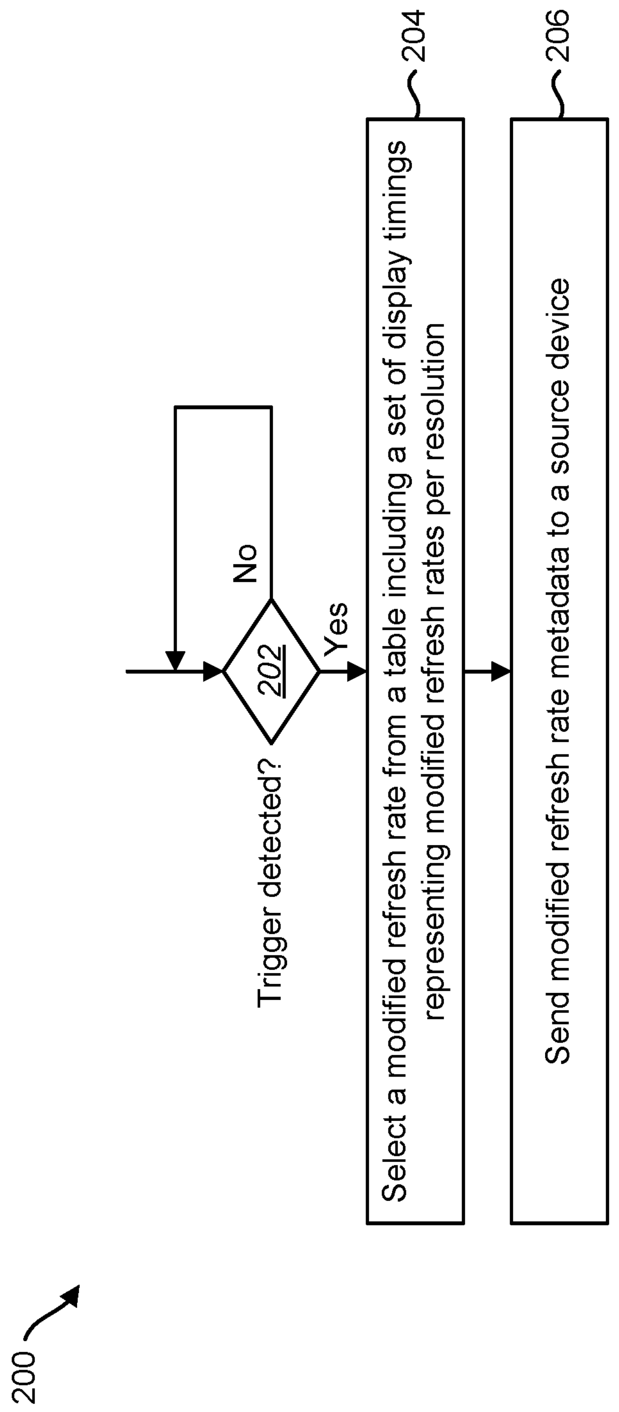
FIG. 2 is a flow diagram illustrating an example of a method for static display metadata modification.

FIG. 2 is a flow diagram illustrating an example of a method 200 for static display metadata modification. The method 200 and/or a method 200 element(s) may be performed by an electronic device (e.g., display device, sink device, etc.). For instance, the method 200 may be performed by the display device 302 described in relation to FIG. 3.

An electronic device may determine 202 whether a trigger to modify static refresh rate metadata is detected. In some examples, the electronic device may determine 202 whether a trigger is detected as described in relation to FIG. 1. For instance, the electronic device may determine whether an input indicating a trigger is detected, whether a received indicator indicates a trigger, and/or whether a condition indicating a trigger is detected. In a case that a trigger is not detected, operation may return to determining 202 whether a trigger is detected (at a subsequent time, for instance).

In a case that a trigger is detected, the electronic device may select 204 a modified refresh rate from a table including a set of display timings representing modified refresh rates per resolution. In some examples, selecting 204 a modified refresh rate may be performed as described in relation to FIG. 1.

The electronic device may send 206 modified refresh rate metadata to a source device. In some examples, sending 206 modified refresh rate metadata may be performed as described in relation to FIG. 1. For instance, the electronic device may generate an EDID message or DisplayID message associated with the modified refresh rate from the table. For instance, the electronic device may generate an EDID message or DisplayID message indicating a modified refresh rate that is different from a static (e.g., actual) refresh rate of the display device. The EDID message or DisplayID message may be sent to the source device via a video link and/or a side link. The message may cause the source device to re-enumerate the video link between the source device and the electronic device.

In some examples, an aspect or aspects of the method 200 may be performed for luminance metadata. For instance, an electronic device may detect a trigger to modify static luminance metadata. In some examples, an electronic device may select modified luminance metadata from a table including a set of modified luminance metadata that is different from static luminance metadata. In some examples, an electronic device may send the modified luminance metadata to a source device.

Figure 3:
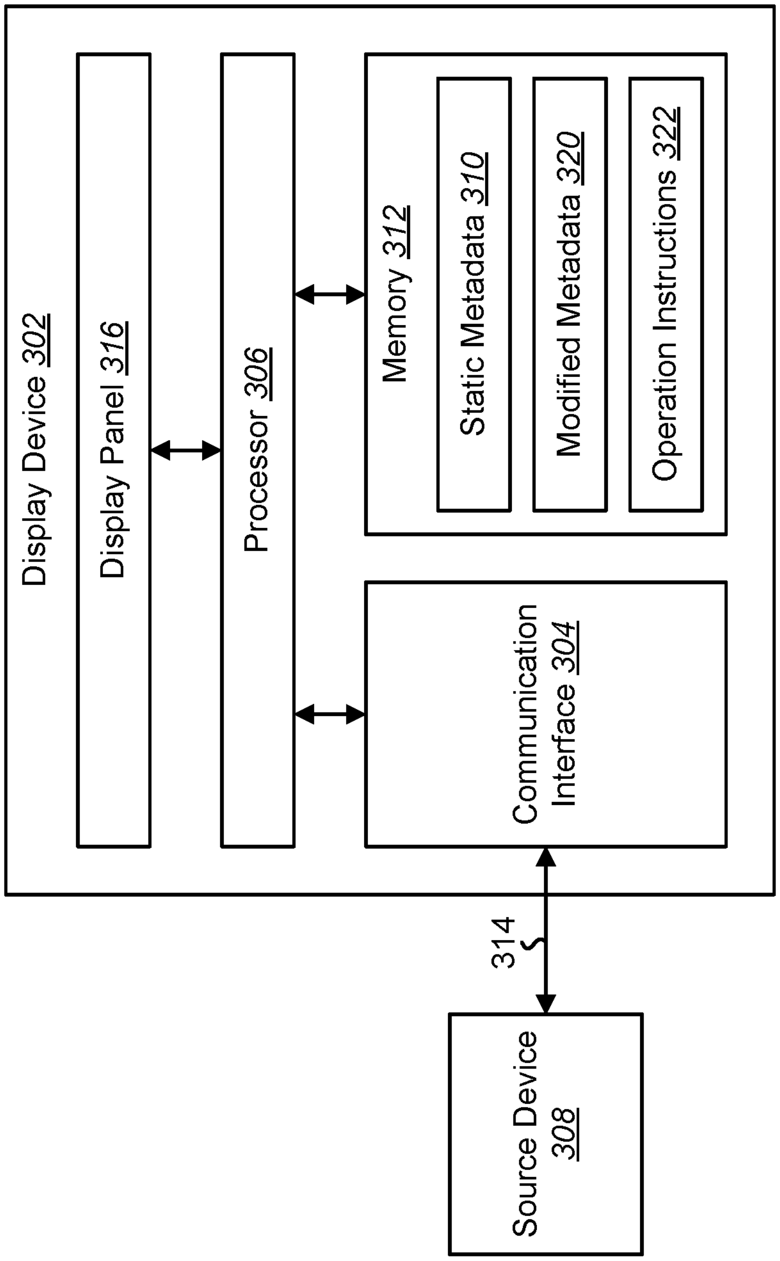
FIG. 3 is a block diagram of an example of a display device that may be used to perform static display metadata modification.

FIG. 3 is a block diagram of an example of a display device 302 that may be used to perform static display metadata modification. Examples of the display device 302 may include a monitor, smart display, television, tablet device, smartphone, projector, etc. The display device 302 may be an example of the electronic device(s) described in relation to FIG. 1 and/or FIG. 2. In some examples, the display device 302 may perform a method or methods (e.g., method 100 and/or method 200) and/or an operation or operations described herein. The display device 302 may be linked to a source device 308 in some examples. The display device 302 may be linked to an additional source device or devices in some examples.

The source device 308 is a device that generates, produces, provides, and/or outputs video (e.g., a video stream, video frames, etc.). Examples of the source device 308 may include a computing device, GPU, audio/video (AV) receiver, smartphone, laptop computer, media player, game console, television stick, media receiver, media drive, media server, video doorbell, etc. The source device 308 may be an example of the source device or source devices described herein.

The source device 308 may be linked to the display device 302 with a link 314. The link 314 may be a wired or wireless link. In some examples, a wired link (e.g., cable) may include multiple wires and/or pins. The link 314 may provide a channel or channels (e.g., data link, auxiliary channel, and/or connection detection channel, etc.) for communication. A channel may be a physical channel (e.g., wire) and/or a logical channel (e.g., frequency domain and/or time domain resources, multiplexed channel, etc.). More or fewer channels, links, and/or cables may be used in some examples.

In some examples, the source device 308 may include transmission circuitry and/or reception circuitry. The link 314 may be provided by and/or connected to the transmission circuitry and/or reception circuitry of the source device 308.

In some examples, the auxiliary channel may carry information and/or messages to set up a video link (e.g., to perform enumeration) between the source device 308 and the display device 302. For instance, the auxiliary channel may carry a request or requests (e.g., identification request(s), setup data request(s), link training request(s), and/or timing data request(s), etc.), display data (e.g., DisplayID and/or EDID), setup data (e.g., DPCD), link training data, and/or timing data, etc.

In some examples, the data link may carry a video signal (e.g., a video stream and/or video frames) from the source device 308 to the display device 302. Once the link 314 is set up, for instance, the data link of the link 314 may carry the video signal to the display device 302.

The display device 302 is a device that includes a display (e.g., display panel 316). The display device 302 may be an example of a sink device. For example, the display device 302 may receive and/or display video (e.g., a video stream, video frames, etc.).

The display device 302 may include a display panel 316, a processor 306, a communication interface 304, and/or a memory 312. The display panel 316 is circuitry to display optical information. Examples of the display panel 316 may include organic light-emitting diode (OLED) display panels, light-emitting diode (LED) liquid crystal display (LCD) panels, microLED panels, miniLED panels, etc. The display panel 316 may display a video signal or video signals (e.g., the video signal from the source device 308). The processor 306 is circuitry to control the display device 302. In some examples, the processor 306 may be a scaler, application-specific integrated circuit (ASIC), and/or other circuitry. In some examples, the processor 306 may include the memory 312 and/or may have access to the memory 312 included in the display device 302. For instance, the processor 306 may read and/or execute instructions stored in memory to perform an operation or operations (e.g., method 100, method 200, and/or operation(s) thereof) described herein.

The memory 312 is a device (e.g., circuitry) to store information. Examples of the memory 312 may include ROM, EPROM, EEPROM, flash memory, DRAM, SDRAM, MRAM, PCRAM, HDD, SSD, optical drive, etc. In some examples, the memory 312 may include (e.g., store) static metadata 310, modified metadata 320, and/or operation instructions 322. The static metadata 310 may include static refresh rate metadata (e.g., static maximum refresh rate metadata and/or static minimum refresh rate metadata) and/or static luminance metadata (e.g., static maximum luminance metadata and/or static minimum luminance metadata). In some examples, the static metadata 310 may indicate actual performance capabilities and/or limits of the display device 302. The processor 306 may execute the operation instructions 322 to perform an operation or operations described herein.

The communication interface 304 is circuitry to communicate with a source device (e.g., the source device 308). The communication interface 304 may be a wired and/or wireless communication interface (e.g., Wi-Fi communication interface, Bluetooth communication interface, cellular communication interface, etc.). In some examples, the communication interface 304 may include a port or ports and corresponding circuitry to support a video link or links. For instance, some ports may be utilized to link to a device (e.g., the source device 308) that may be external to the display device 302. Examples of ports with supporting circuitry may include a Universal Serial Bus (USB) interface (e.g., USB Type-C® (USB-C®), USB Type-A, USB Type-B, USB 2.0, USB 3.0, USB Mini-B, USB Micro-B, etc.), Lightning® interface, Ethernet interface, DisplayPort™ interface, HDMI® interface, etc. In some examples, the communication interface 304 may include a port, transceiver circuitry, and/or an interface controller. For instance, the communication interface 304 may enable receiving video for display on the display device 302. In some examples, the communication interface 304 may receive a video signal (from the source device 308, for instance).

In some examples, the communication interface 304 may send static luminance metadata to the source device 308 during a first enumeration. For instance, during a first enumeration, the processor 306 may provide static luminance metadata to the communication interface 304, which may send the static luminance metadata to the source device 308. In some examples, the communication interface 304 may read the static luminance metadata from the memory 312 (via a bus or internal interface, for instance). In some examples, the static luminance metadata may be sent to the source device 308 as part of an EDID message and/or DisplayID message.

In some examples, the processor 306 may execute the operation instructions 322 to modify the static luminance metadata to produce modified luminance metadata. For instance, the processor 306 may generate and/or read modified metadata 320 for use instead of the static metadata 310. For example, the processor 306 may generate modified maximum luminance metadata (e.g., 400 nits) that is different from static maximum luminance metadata (e.g., 1000 nits). In some examples, the modified luminance metadata may be included in an EDID or DisplayID. In some examples, the processor 306 may modify the static luminance metadata in response to a trigger. Examples of a trigger are described in relation to FIG. 1.

In some examples, the processor 306 may execute the operation instructions 322 to cause the communication interface 304 to send the modified luminance metadata to the source device 308 during a second enumeration. For instance, the communication interface 304 may send the modified luminance metadata (e.g., modified EDID and/or DisplayID) with an enumeration indicator.

In some examples, the modified luminance metadata may indicate a lower luminance than the static luminance metadata. For instance, a static maximum luminance metadata may indicate 1000 nits and modified maximum luminance metadata may indicate 400 nits. In some examples, the processor 306 may execute the operation instructions to detect, in a video signal received from the source device 308, a luminance value that is outside of a luminance range indicated by the modified luminance metadata. For instance, the processor 306 may execute the operation instructions 322 to detect, in a video signal received from the source device 308, a luminance value that exceeds a maximum luminance of the modified luminance metadata. For instance, the processor 306 may detect whether a luminance value (e.g., 650 nits) of the video signal exceeds a maximum luminance (e.g., 400 nits) indicated by the modified luminance metadata.

In a case that the luminance value is outside of the luminance range indicated by the modified luminance metadata, the processor 306 may execute the operation instructions 322 to produce an indication that the luminance value is outside of the luminance range (e.g., greater than a maximum luminance or less than a minimum luminance indicated by the modified luminance metadata). In some examples, the processor 306 may generate a message for display on the display panel 316 indicating that a luminance value is out of range. In some examples, the processor 306 may mark a pixel or pixels corresponding to the luminance value that is out of range. Marking a pixel may include changing a pixel value. For instance, the processor 306 may mark a pixel by changing the pixel color and/or luminance. In some examples, a pixel or pixels with an out-of-range luminance value or values may be marked in bright red, blue, green, or an inverted pixel value, etc., which may enable the marked pixel(s) to be observed on the display panel 316. For instance, the processor 306 may mark a pixel corresponding to the luminance value that exceeds the maximum luminance. In some examples, a marked pixel or pixels may indicate pixels (e.g., clipped content) that may not be observable on a display device with the lower luminance performance.

In some examples, the processor 306 may execute the operation instructions 322 to modify a backlight zone setting based on the modified luminance metadata. A backlight zone setting is a setting to control a quantity, location, and/or brightness of backlights in the display panel 316. For instance, different display panels (e.g., different LED LCD panels) may include different quantities of backlights, different locations, and/or different brightness characteristics. Modifying a backlight zone setting may simulate the performance of a different display panel. In some examples, the luminance metadata may be modified to change the video signal and the backlight zone setting may change the behavior of sets of pixels and/or zones, which may help to show how another display device with different characteristics may perform. For instance, the backlight zone settings may be changed to group pixels corresponding to a zone such that pixels in the group produce the same or similar luminance.

In some examples, the display device 302 may perform an aspect or aspects of the methods 100, 200 described in relation to FIG. 1 and/or FIG. 2. For instance, the display device 302 may modify refresh rate metadata as described in FIG. 1 and/or FIG. 2.

Figure 4:
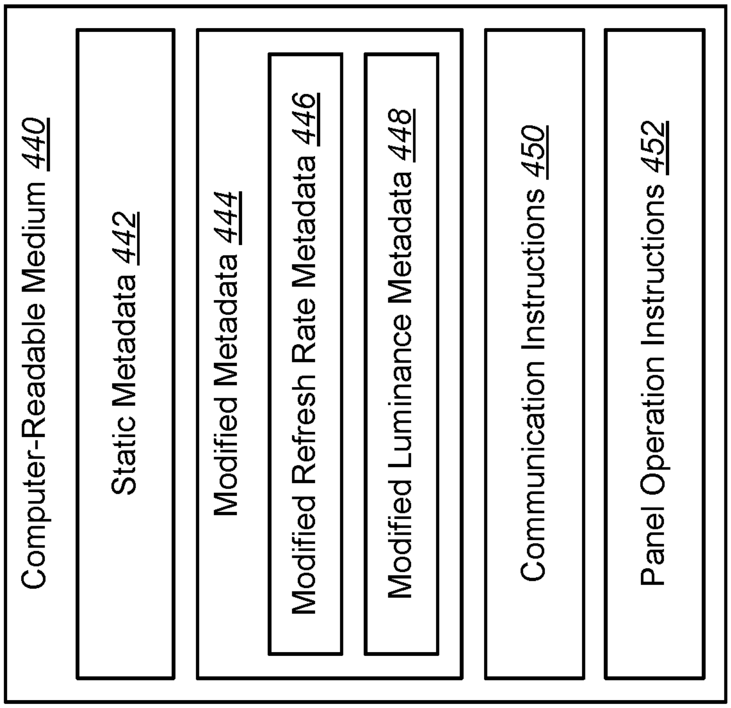
FIG. 4 is a block diagram illustrating an example of a computer-readable medium for static display metadata modification.

FIG. 4 is a block diagram illustrating an example of a computer-readable medium 440 for static display metadata modification. The computer-readable medium 440 may be a non-transitory, tangible computer-readable medium. The computer-readable medium 440 may be, for example, RAM, EEPROM, a storage device, an optical disc, and/or the like. In some examples, the computer-readable medium 440 may be volatile and/or non-volatile memory, such as DRAM, EEPROM, MRAM, PCRAM, memristor, flash memory, and/or the like. In some examples, the computer-readable medium 440 may be included in a display device and/or may be accessible to a processor of a display device. In some examples, the computer-readable medium 440 may be an example of the memory 312 described in relation to FIG. 3.

The computer-readable medium 440 may include code (e.g., data, executable instructions, and/or executable code). For example, the computer-readable medium 440 may include static metadata 442, modified metadata 444, modified refresh rate metadata 446, modified luminance metadata 448, communication instructions 450, and/or panel operation instructions.

In some examples, the static metadata 442 may include static refresh rate metadata and/or static luminance metadata. The static metadata 442 may be an example of the static metadata described in relation to FIG. 1, FIG. 2, and/or FIG. 3.

In some examples, the modified metadata 444 may include modified refresh rate metadata 446 and/or modified luminance metadata 448. The modified metadata 444 may be an example of the modified metadata described in relation to FIG. 1, FIG. 2, and/or FIG. 3.

In some examples, the communication instructions 450 are instructions that when executed cause a processor (e.g., a processor of a display device) to send first metadata (e.g., static metadata 442) indicating a static refresh rate range of a display panel to a source device. For instance, the static metadata 442 may be sent to the source device as described in relation to FIG. 1, FIG. 2, and/or FIG. 3. For instance, the static metadata 442 may be sent as EDID and/or DisplayID information. In some examples, a refresh rate range may be indicated by sending maximum refresh rate metadata and minimum refresh rate metadata.

In some examples, the panel operation instructions 452 may be instructions when executed cause a processor (e.g., processor of a display device) to operate a display panel in a variable refresh rate mode. A variable refresh rate mode is a mode of operation in which a display device may receive a video signal with varying frame rates and may adjust a refresh rate of the display panel to match the varying frame rates. In some examples, the processor may determine to operate the display panel in the variable refresh rate mode based on video link setup. During enumeration, for instance, a source device may indicate a command to operate in a variable refresh rate mode. In response, the display panel (e.g., processor) may activate the variable refresh rate mode.

In some examples, the communication instructions 450 may be instructions that when executed cause a processor (e.g., a processor of a display device) to send an enumeration indicator to the source device. In some examples, the processor may send the enumeration indicator as described in relation to FIG. 1 and/or FIG. 2.

In some examples, the communication instructions 450 may be instructions that when executed by a processor (e.g., a processor of a display device) send second metadata indicating a modified refresh rate range associated with the enumeration indicator. For example, the processor may select send EDID and/or DisplayID information that includes the second metadata indicating a modified refresh rate range (with modified maximum refresh rate metadata and/or modified minimum refresh rate metadata, for instance). For instance, the second metadata may be sent as described in relation to FIG. 1, FIG. 2, and/or FIG. 3.

In some examples, the computer-readable medium may include modified metadata determination instructions. The modified metadata determination instructions may be instructions that when executed cause a processor (e.g., a processor of a display device) to determine the second metadata based on a table including modified maximum refresh rates and modified minimum refresh rates. For instance, the modified refresh rate metadata 446 may include the table, and the processor may select the second metadata as described in relation to FIG. 1, FIG. 2, and/or FIG. 3. In some examples, the modified refresh rate range is smaller than the stat refresh rate range. In some examples, an operation or operations described herein with respect to refresh rate metadata may be performed with respect to luminance metadata.

A technique or techniques, a method or methods (e.g., method(s) 100 and/or 200) and/or an operation or operations described herein may be performed by (and/or on) a sink device and/or a device that is a sink device and a source device. For instance, a technique or techniques described herein may be performed on a display device, monitor, television, computer with an integrated display panel, etc. In some examples, a source device and/or a sink device may include circuitry (e.g., a processor with instructions and/or connection interface circuitry) to perform a technique or techniques described herein.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples are described herein, the disclosure is not limited to the examples. Variations of the examples described herein may be within the scope of the disclosure. For example, aspects or elements of the examples described herein may be omitted or combined.

The invention claimed is:

1. A method, comprising:
- detecting, by a display device, a trigger to modify static refresh rate metadata stored on the display device;
- modifying, by the display device in response to detecting the trigger, the static refresh rate metadata to produce modified refresh rate metadata; and
- sending, by the display device in response to modifying the static refresh rate metadata, the modified refresh rate metadata to a source device to set up a video link between the source device and the display device.

2. The method of claim 1, wherein modifying the static refresh rate metadata comprises selecting a modified refresh rate from a table including a set of display timings representing modified refresh rates per resolution.

3. The method of claim 1, wherein the modified refresh rate metadata indicates a maximum refresh rate that is different from an actual maximum refresh rate of the display device.

4. The method of claim 1, wherein detecting the trigger comprises detecting an input via an on-screen display (OSD).

5. The method of claim 1, wherein detecting the trigger comprises receiving an indicator from the source device.

6. The method of claim 5, wherein the indicator is a virtual control panel (VCP) code.

7. The method of claim 1, wherein detecting the trigger comprises detecting a flicker condition.

8. The method of claim 7, wherein detecting the flicker condition comprises detecting a variable refresh rate change condition or a panel age condition.

9. A display device, comprising:
- a communication interface to send static luminance metadata to a source device during a first enumeration; and
- a processor to:
  - modify the static luminance metadata to produce modified luminance metadata based on a result of the first enumeration; and
  - cause the communication interface to send the modified luminance metadata to the source device during a second enumeration.

10. The display device of claim 9, wherein the modified luminance metadata indicates a lower luminance than the static luminance metadata, and wherein the processor is to detect, in a video signal received from the source device, a luminance value that exceeds a maximum luminance of the modified luminance metadata.

11. The display device of claim 10, wherein the processor is to mark a pixel corresponding to the luminance value that exceeds the maximum luminance.

12. The display device of claim 9, wherein the processor is to modify a backlight zone setting based on the modified luminance metadata.

13. A non-transitory tangible computer-readable medium comprising instructions when executed cause a processor to:
- send, to a source device, first metadata indicating a static refresh rate range of a display panel;
- operate the display panel in a variable refresh rate mode;
- send an enumeration indicator to the source device; and
- send second metadata to the source device indicating a modified refresh rate range associated with the enumeration indicator.

14. The non-transitory tangible computer-readable medium of claim 13, wherein the processor is to determine the second metadata based on a table Including modified maximum refresh rates and modified minimum refresh rates.

15. The non-transitory tangible computer-readable medium of claim 13, wherein the modified refresh rate range is smaller than the static refresh rate range.

* * * * *